United States Patent Office 3,206,516
Patented Sept. 14, 1965

3,206,516
PROCESS FOR THE PRODUCTION OF
1,4-DICHLORO HYDROCARBONS
Willi Ziegenbein and Karl-Heinz Hornung, Marl, Kreis
Recklinghausen, Germany, assignors to Farbenfabriken
Bayer Aktiengesellschaft, Leverkusen, Germany, a
German corporation
No Drawing. Filed Nov. 19, 1962, Ser. No. 238,795
9 Claims. (Cl. 260—652)

The present invention relates to a process for the production of 1,4-dichloro hydrocarbons.

It is known to produce 1,4-dichloro butane from tetrahydrofurane by splitting the latter with hydrogen chloride alone or in the presence of water or sulfuric acid under pressure at 140–150° C. The ring fission succeeds also with thionyl chloride in the presence of zinc chloride. In these reactions, dichloro butyl ether is obtained as an undesired by-product if the zinc chloride is replaced by aluminum chloride or sulfuric acid. Chlorine is unsuitable as a splitting agent since, in contrast to bromine, it effects substitution.

These above processes work, therefore, at elevated pressures and temperatures with hard to handle chemicals and with unsatisfactory yield.

It is an object of the present invention to provide a process of producing 1,4-dichlorinated hydrocarbons which avoids the above difficulties and disadvantages. Further objects will become apparent as the following specification proceeds.

It has now been found that 1,4-dichloro hydrocarbons can be advantageously obtained from hydrogenated or alkyl substituted hydrogenated furane by reacting the furane with the reaction product of an inorganic acid chloride with an N,N-disubstituted formamide.

Suitable hydrogenated furanes are, for instance, 2,5-dihydrofurane, tetrahydrofurane, 2-methyl tetrahydrofurane easily accessible from furfural, further 2,5-diethyl tetrahydrofurane etc.

As inorganic acid chloride, phosgene is especially suitable, also phosphorus oxychloride, phosphorus trichloride, phosphorus pentachloride and thionyl chloride can be employed.

N,N-disubstituted formamides suitable for the process of the invention are dimethyl formamide, diethyl formamide and similar compounds with identical alkyl groups which contain each up to five carbon atoms, further those in which the alkyl groups are not identical, like methyl ethyl formamide, further compounds with mixed aromatic and aliphatic substituents, like N-formyl-N-methyl aniline and finally those in which the hydrocarbon radicals are part of a ring which may contain hetero atoms, like N-formyl morpholine and N-formyl piperidine.

The reaction of acid chlorides with an N,N-disubstituted formamide yields salt like products, which are known. For instance, the reaction of phosgene and dimethyl formamide yields the carbamic chloride I:

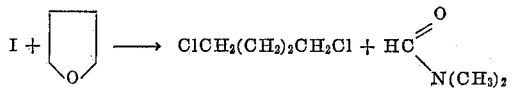

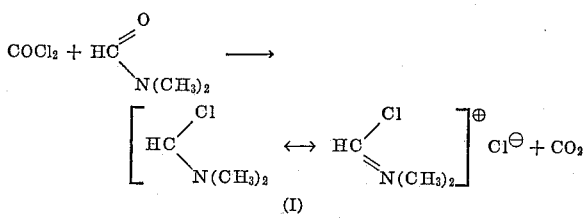

This reaction product I can be reacted for example with tetrahydrofurane to 1,4-dichloro butane. The dimethyl formamide employed for the formation of I can be recovered in an amount equimolar to the phosgene used:

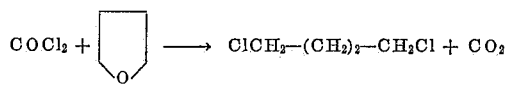

In the summary equation the reaction is presented as follows:

$$COCl_2 + \underset{O}{\bigcup} \longrightarrow ClCH_2-(CH_2)_2-CH_2Cl + CO_2$$

The carbamic chloride I is preferably obtained from equimolar proportions of dimethyl formamide and phosgene. Moisture should be excluded. The phosgene is introduced into the dimethyl formamide at room temperature or at a temperature slightly below room temperature. The salt like reaction product I, formed with evolution of molar amounts of carbon dioxide, precipitates in the crystalline form and can be recovered by filtration. As diluents chlorinated hydrocarbons, like chloroform, dichloro ethylene, carbon tetrachloride, trichloro ethylene may be employed; further aliphatic ethers like diethyl ether, dipropyl ether, methyl butyl ether. Compound I can also be obtained without additional solvents if dimethyl formamide is employed in excess and used as a solvent. Finally, the production of Compound I may be carried out also at temperatures from about 10 to about 20° C. in the hydrogenated furane (preferably in excess). The reaction of the hydrogenated furane can then be carried out without recovering Compund I.

The reaction of the hydrogenated furane proceeds at temperatures between 40 and 150° C., preferably between 50 and 100° C. Advantageously, the reaction occurs at the reflux temperature of the reaction mixture. The end of the reaction can be observed from the fact that the reaction mixture has become homogeneous— apart from slight residues which are filtered off or decanted. The recovery of the reaction product is carried out by distillation. A water-clear distillate is obtained which—in the example of dimethyl carbamic chloride with tetrahydrofurane—boils at 50 to 57° C. at 15 mm./Hg and which consists of a mixture of 1,4-dichloro butane and dimethyl formamide. The components may be separated completely by washing of the distillate with water. The dimethyl formamide is dissolved in water while 1,4-dichloro butane can be redistilled, if desired after drying. The reaction mixture may also be stirred into water, where the two phases separate. If higher boiling N-disubstituted formamides are employed instead of dimethyl formamide, for instance N-formyl morpholine, N-formyl piperidine, or N-formyl-N-methyl aniline, the separation from 1,4-dichloro butane is simpler by fractionated distillation.

If instead of phosgene other inorganic acid chlorides are employed, for instance phosphorus oxychloride, phosphorus trichloride or phosphorus pentachloride, the compounds with dimethyl formamide obtained have the general Formula II

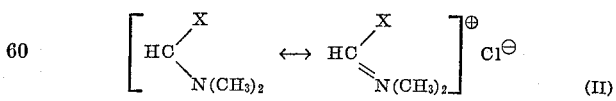

in which X is $OPOCl_2$, $OPCl_2$ or $OPCl_4$. These compounds react also with hydrogenated furanes with the formation of 1,4-dichloro hydrocarbons, preferably in the solvents mentioned supra. The recovery of the reaction products of the Compounds II with the hydrogenated furanes necessitates first the neutralization of the inorganic acids or acid chlorides liberated during the reaction. A saturated solution of sodium bicarbonate or sodium acetate is useful for this purpose.

It is known that phosgene reacts directly with tetrahydrofurane. The reaction product, however, is not 1,4-dichloro butane but carbonic acid bis-(4-chlorobutylate). Surprisingly, according to the process of the invention only 1,4-dichloro butane is obtained in high yields, the carbonic acid ester not even as a byproduct. It could not be foreseen that 1,4-dichloro hydrocarbons could be obtained for the further reason that the carbamic chloride I reacts with 1,2-epoxides to yield 1-formyl-2-chloro compounds. The fission of the hydrofurane ring described herein is therefore new and unobvious.

The process of the invention renders it possible to easily obtain 1,4-dichloro butane and 1,4-dichloro butene, which have a high nematocidal potency and are therefore used as nematocides commercially.

In the following examples the parts are by weight.

Example 1

Phosgene is introduced into a mixture of 288 parts of tetrahydrofurane and 73 parts of dimethyl formamide while stirring with exclusion of moisture at a temperature of 10 to 20° C. until the weight of the mixture has increased by 55 parts. The carbamic chloride of Formula I precipitates practically quantitatively. The reaction mixture is subsequently refluxed for 22 hours with vigorous stirring. The boiling point of the mixture rises during the reaction from 65 to 78° C. After cooling and decanting from a solid, water-soluble residue (21 parts) excess tetrahydrofurane is distilled from the liquid phase. The oily residue which consists of dimethyl formamide and 1,4-dichloro butane is distilled in a vacuum of 15 mm./Hg at 50 to 57° C. 148 parts of distillate and 24 parts of a residue are obtained which consists preponderantly of dimethyl formamide. From the distillate the dimethyl formamide is removed by washing with water. 103 parts of 1,4-dichloro butane are recovered having a boiling point of 46 to 48° C. at 13 mm./Hg, $n_D^{20}=1.4532$. The yield is 80% of the theoretical, calculated on the carbamic chloride of Formula I.

Example 2

170 parts of phosphorus oxychloride are gradually added with exclusion of moisture and with vigorous stirring to a solution of 97 parts of dimethyl formamide and 400 parts of trichloro ethylene. The temperature is kept between 10 to 25° C. To the solution thus prepared of the compound of Formula II (X=OPOCl$_2$), there is added a mixture of 72 parts of tetrahydrofurane and 160 parts of trichloro ethylene. The reaction mixture is heated for two hours to 50 to 60° C. After cooling, a solution of 500 parts of sodium acetate in 1000 parts of water is added carefully to the reaction mixture. The same is then extracted with ether. The dried ethereal solution is evaporated and washed several times with water to remove dimethyl formamide and acetic acid. The dried organic phase is distilled in vacuo. 1,4-dichloro butane is obtained in a yield of 60% of the theoretical, calculated on the tetrahydrofurane.

Example 3

Phosgene is introduced into a mixture of 258 parts of α-methyl tetrahydrofurane and 73 parts of dimethyl formamide while stirring with exclusion of moisture until the weight of the mixture has increased by 55 parts. The mixture is refluxed for 12 hours with vigorous stirring. After cooling the reaction mixture to room temperature the same is decanted from a solid residue, and the excess α-methyl tetrahydrofurane is distilled off. The residue of this distillation is again distilled in a vacuum of 14 mm./Hg. The distillate consists of dimethyl formamide and 1,4-dichloro pentane. After washing the distillate with water, 78 parts of 1,4-dichloro pentane are recovered. It has a boiling point of 60 to 63° C. at 15 mm./Hg, $$n_D^{20}=1.4508$$

The yield is 55% of the theoretical, calculated on the carbamic chloride of Formula I.

Example 4

Phosgene is introduced into a mixture of 210 parts of 2,5-dihydro furane and 73 parts of dimethyl formamide while stirring with exclusion of moisture until the weight of the mixture has increased by 55 parts. The mixture is refluxed for 15 hours with vigorous stirring. After cooling the reaction mixture to room temperature, the same is decanted from a solid residue (46 parts) and the excess 2,5-dihydro furane is distilled off at normal pressure. The residue of this distillation is again distilled in a vacuum of 17 mm./Hg. The distillate consists of dimethyl formamide and cis-1,4-dichloro butene-(2). After removing the dimethyl formamide from the distillate by washing with water the organic phase is distilled. 92 parts of cis-1,4-dichloro butene-(2) are obtained with a boiling point of 45 to 47° C. at 12 mm./Hg, $n_D^{23}=1.4834$. The yield is 74% of the theoretical, calculated on the carbamic chloride of Formula I.

Example 5

Phosgene is introduced into a mixture of 288 parts of tetrahydrofurane and 105 parts of N-formyl morpholine at about 10° C. while stirring until the weight of the mixture has increased by 50 parts. The carbamic chloride, which contains instead of —N(CH$_3$)$_2$ of the Formula I the morpholinyl radical, precipitates practically quantitatively. The mixture is refluxed for about 19 hours with stirring. After filtering from a brown, water-soluble residue (about 47 parts), excess tetrahydrofurane is distilled from the filtrate at normal pressure. 82 parts of 1,4-dichloro butane are obtained with a boiling point of 56 to 60° C. at 15 mm./Hg corresponding to 71% of the theoretical yield, calculated on the carbamic chloride from N-formyl morpholine and phosgene. The residue of the distillation is N-formyl morpholine.

Example 6

238 parts of thionyl chloride are gradually added at room temperature (20° C.) to a mixture of 146 parts of dimethyl formamide and 144 parts of tetrahydrofurane. The mixture is then heated to 90° C. Sulfur dioxide is evolved until the reaction is completed (about 10 hours). After cooling, the liquid reaction product is separated from a solid residue and distilled in vacuo. The distillate is washed with a dilute aqueous sodium bicarbonate solution and then with water in order to remove dimethyl formamide and residual sulfur dioxide. The dried organic phase is distilled in vacuo. 150 parts of 1,4-dichloro butane are obtained corresponding to 59% of the theoretical yield.

We claim:

1. A process for producing 1,4-dichlorohydrocarbons comprising admixing (1) hydrogenated furane, with (2) the reaction product of inorganic acid chloride and a N,N-dialkyl-substituted formamide, the alkyl groups of which contain not more than 5 carbon atoms; heating the mixture to about 40–150° C. and recovering the resulting product.

2. The process of claim 1 wherein the furane is a member selected from the group consisting of tetrahydrofurane, 2,5-dihydrofurane, 2-methyl tetrahydrofurane and 2,5-diethyl tetrahydrofurane; the inorganic acid chloride is a member selected from the group consisting of phosgene, phosphorus oxychloride, phosphorus trichloride, phosphorus pentachloride and thionyl chloride; and the reaction product (2) is a carbamic chloride.

3. The process of claim 1 wherein the N,N-dialkyl-substituted formamide is a member selected from the group consisting of dimethyl formamide, diethyl formamide, methyl ethyl formamide, N-formyl-N-methyl aniline, N-formyl morpholine and N-formyl piperidine; the reaction of the inorganic acid chloride, and the formamide being effected at about room temperature to obtain a compound having the formula

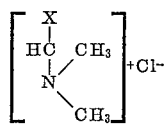

wherein X is a member selected from the group consisting of —Cl, —OPOCl$_2$, —OPCl$_2$ and —OPCl$_4$.

4. The process of producing 1,4-dichloro butane which process comprises heating together at a temperature of about 65–78° C. tetrahydrofurane with the room temperature reaction product of phosgene and dimethyl formamide, and recovering the 1,4-dichloro butane from the reaction mixture.

5. The process of producing 1,4-dichloro butane which process comprises heating together at a temperature between 50–60° C. tetrahydrofurane with the room temperature reaction product of dimethyl formamide and phosphorus oxychloride, and recovering the 1,4-dichloro butane from the reaction mixture.

6. The process of producing 1,4-dichloro pentane which process comprises refluxing a mixture of α-methyl tetrahydrofurane with the room temperature reaction product of phosgene and dimethyl formamide, and recovering the 1,4-dichloro pentane from the reaction mixture.

7. The process of producing cis-1,4-dichloro butene-(2) which process comprises refluxing 2,5-dihydrofurane with the room temperature reaction product of dimethyl formamide and phosgene, and recovering the cis-1,4-dichloro butene-(2) from the reaction mixture.

8. The process of producing 1,4-dichloro butane which process comprises refluxing tetrahydrofurane with the room temperature reaction product of N-formyl morpholine and, phosgene, and recovering the 1,4-dichloro butane from the reaction mixture.

9. The process of producing 1,4-dichloro butane which process comprises heating together at a temperature of about 90° C. tetrahydrofurane with the room temperature reaction product of dimethyl formamide and thionyl chloride until the evolution of sulfur dioxide has ceased, and recovering the 1,4-dichlorobutane from the reaction mixture.

References Cited by the Examiner
FOREIGN PATENTS 857,352  11/52  Germany.

OTHER REFERENCES

Ziegenbein et al.: "Chemische Berichte," vol. 93, (1960), pp. 1681–1683.

LEON ZITVER, *Primary Examiner.*